United States Patent
Kim et al.

(10) Patent No.: US 9,893,909 B2
(45) Date of Patent: Feb. 13, 2018

(54) METHOD AND SYSTEM FOR ALLOWING REMOTE ACCESS DEVICE TO ACCESS REMOTE ACCESS TARGET DEVICE WITHIN HOME NETWORK

(75) Inventors: Byung-Jae Kim, Daejeon (KR); Jeong-Gyun Ahn, Daejeon (KR); Geun-Young Kim, Daejeon (KR); Sang-Jo Kim, Daejeon (KR); Byung-Gu Lee, Daejeon (KR)

(73) Assignee: KT Corporation, Seongnam (KR)

( * ) Notice: Subject to any disclaimer, the term of this patent is extended or adjusted under 35 U.S.C. 154(b) by 1210 days.

(21) Appl. No.: 13/327,249

(22) Filed: Dec. 15, 2011

(65) Prior Publication Data

US 2012/0158900 A1    Jun. 21, 2012

(30) Foreign Application Priority Data

Dec. 15, 2010  (KR) .................. 10-2010-0128269

(51) Int. Cl.
*H04L 12/64*    (2006.01)

(52) U.S. Cl.
CPC ................ *H04L 12/6418* (2013.01)

(58) Field of Classification Search
CPC .................................. H04L 12/6418
See application file for complete search history.

(56) References Cited

U.S. PATENT DOCUMENTS

| | | | |
|---|---|---|---|
| 2004/0148406 A1* | 7/2004 | Shima | 709/228 |
| 2006/0056397 A1* | 3/2006 | Aizu | H04L 12/66 370/352 |
| 2007/0110039 A1* | 5/2007 | Park | 370/352 |
| 2009/0037556 A1* | 2/2009 | Kokkinen et al. | 709/217 |
| 2010/0312851 A1* | 12/2010 | Jackson | H04L 67/104 709/217 |

FOREIGN PATENT DOCUMENTS

| | | |
|---|---|---|
| KR | 10-0548265 B1 | 2/2006 |
| KR | 10-20060067713 A | 6/2006 |
| KR | 10-0662509 B1 | 12/2006 |
| KR | 10-20090053978 A | 5/2009 |

\* cited by examiner

*Primary Examiner* — Noel Beharry
*Assistant Examiner* — Wilfred Thomas
(74) *Attorney, Agent, or Firm* — Sughrue Mion, PLLC (57) ABSTRACT

There is provided a method for allowing a remote access device to access a remote access target device within a home network. The method includes receiving, from a remote access agent of the home network, access information of the remote access target device within the home network and access information of the remote access agent; receiving a request for the access information of the remote access target device from the remote access device; requesting, to the remote access agent, port forwarding for the remote access target device based on the access information of the remote access target device and the remote access agent; receiving an answer to the request from the remote access agent, and updating the access information of the remote access target device based on the received answer; and sending the updated access information to the remote access device.

17 Claims, 3 Drawing Sheets

METHOD AND SYSTEM FOR ALLOWING REMOTE ACCESS DEVICE TO ACCESS REMOTE ACCESS TARGET DEVICE WITHIN HOME NETWORK

CROSS-REFERENCE TO RELATED PATENT APPLICATION

This application claims priority from Korean Patent Application No. 10-2010-0128269, filed on Dec. 15, 2010 in the Korean Intellectual Property Office, the entire contents of which are incorporated by reference herein.

BACKGROUND

1. Field

Apparatuses, systems, and methods consistent with the present disclosure relate to allowing a remote access device to access a remote access target device within a home network and, in particular, to allowing an external device to access a device within a home network constructed by a private network.

2. Description of the Related Art

A Universal Plug and Play (UPnP) protocol is an Internet Protocol (IP)-based standard protocol technology, which is generally used for communication among a plurality of devices within a home network.

A device within a home network uses a Uniform Resource Locator (URL) to other UPnP devices on the home network.

Accordingly, a user may access the URL of the device through a web browser to use a user interface for the device.

However, if the home network is provided in a private network environment the URL includes private IP address information. Thus, it is difficult for a remote terminal outside the home network to access a device within the home network by only using the URL including the private IP address information.

SUMMARY

Aspects of one or more exemplary embodiments provide a method and a system, in which a remote access control server makes a request for setting up port forwarding for a device within a home network constructed in a private network environment in response to a request from a user, and presentation URL information for the device within the home network is corrected, such that a user of a remote access terminal easily executes remote access to the device within the home network.

According to an aspect of an exemplary embodiment, there is provided a method for allowing a remote access device to access a remote access target device within a home network through a remote access control server. The method includes receiving, from a remote access agent of the home network, access information of the remote access target device within the home network and access information of the remote access agent, receiving a request for the access information of the remote access target device from the remote access device, in response to the received request for access information, requesting, to the remote access agent, port forwarding for the remote access target device based on the access information of the remote access target device and the access information of the remote access agent, receiving an answer to the request of port forwarding from the remote access agent, and updating the access information of the remote access target device based on the received answer and sending the updated access information to the remote access device, wherein the updated access information allows the remote access device to access the remote access target device from outside the home network.

In an aspect of an exemplary embodiment, the receiving the request may include receiving a request for list information of devices included in the home network from the remote access device, in response to the request for the list information of the devices, transmitting the list information of the devices included in the home network to the remote access device, the list information being compiled from access information of the remote access target device received from the remote access agent and receiving a request for the access information of the remote access target device included in the list information of the devices, from the remote access device.

In an aspect of an exemplary embodiment, transmitting the list information may include acquiring user identification information of the remote access device from the request for the list information of the devices that has been received from the remote access device and transmitting, to the remote access device, list information of at least one remote access target device within the home network corresponding to the user identification information.

According to an aspect of another exemplary embodiment, there is provided a system for allowing a remote access device to access a remote access target device within a home network. The system includes a port forwarding information managing unit, in response to a request for the access information of the remote access target device received from the remote access device, configured to request, to the remote access agent, port forwarding for the remote access target device based on the access information of the remote access agent and the access information of the remote access target device and an access information managing unit configured to update the access information of the remote access target device based on an answer to the request of port forwarding received from the remote access agent, and transmit the updated access information to the remote access device, wherein the updated access information allows the remote access device to access the remote access target device from outside the home network.

In an aspect of another exemplary embodiment, the system may further include a home network information providing unit configured to provide the remote access device with list information including information on at least one device included in the home network, the list information being generated based on the received access information of the remote access target device, wherein the request for the access information of the remote access target device is generated based on the list information provided to the remote access device.

In an aspect of another exemplary embodiment, the home network information providing unit may receive user identification information from the remote access device, and provide the remote access device with the list information on at least one remote access target device within the home network corresponding to the received user identification information.

In an aspect of another exemplary embodiment, the access information on the remote access agent may include public Internet Protocol (IP) address information of the remote access agent and the port forwarding information managing unit requests port forwarding to the remote access agent corresponding to the public IP address.

In an aspect of another exemplary embodiment, the access information of the remote access target device may include information on a private Internet Protocol (IP) address and port number of the remote access target device, and the port forwarding information managing unit may request port forwarding to the remote access agent based on the information on the private IP address and the port number.

In an aspect of another exemplary embodiment, the access information managing unit may acquire information on external port number of the remote access target device from an answer to the request of the port forwarding, and the updated access information of the remote access target device may include the acquired external port number of the remote access target device and the access information of the remote access agent.

In an aspect of another exemplary embodiment, the updated access information of the remote access target device may include presentation Uniform Resource Locator (URL) information including the information on the external port number of the remote access target device and the public IP address of the remote access agent.

BRIEF DESCRIPTION OF THE DRAWINGS

Non-limiting and non-exhaustive embodiments will be described in conjunction with the accompanying drawings. Understanding that these drawings depict only several exemplary embodiments in accordance with the disclosure and are, therefore, not to be intended to limit its scope, the disclosure will be described with specificity and detail through use of the accompanying drawings, in which.

DETAILED DESCRIPTION

Hereinafter, exemplary embodiments in accordance with the present disclosure will be described in detail by reference to the accompanying drawings so that the present disclosure may be readily implemented by those skilled in the art. However, it is to be noted that the present disclosure is not limited to the exemplary embodiments but can be realized in various other ways. In the drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, the term "comprises or includes" and/or "comprising or including" used in the document means that one or more other components, steps, operation and/or existence or addition of elements are not excluded in addition to the described components, steps, operation and/or elements.

A device within a home network informs the other devices within the home network of its existence by transmitting a Simple Service Discovery Protocol (SSDP) multicast message to the other devices through the UPnP. The devices that have received the SSDP message may recognize a type of the UPnP device that has transmitted the SSDP message, by using information recorded in the received SSDP message, and may access a Uniform Resource Locator (URL) recorded in a LOCATION field of the SSDP message to obtain more detailed information about the UPnP device.

Generally, the LOCATION field includes a URL for an XML document including description information of a corresponding device. The description information includes information such as a manufacturer and a model code of the UPnP device, and information about a presentation URL useful for access to a web server provided by the UPnP device.

Accordingly, a user may access the presentation URL of the device through a web browser to use a user interface for the device.

However, as discussed above, if the home network is provided in a private network environment using an IP sharer or the like, the presentation URL will include private IP address information. Thus, there is a disadvantage in that a remote terminal outside the home network has difficulty in accessing a device within the home network by only using the presentation URL including the private IP address information.

In order to access such a device, the user of the home network sets up port forwarding for the corresponding device to a gateway within the home network. After setting up port forwarding, the user subscribes to separate services to obtain a dynamic public IP address allocated in wide area network (WAN) of the IP sharer. Thus, there is a disadvantage in that this process is complex and a user having no special knowledge has difficulty in executing remote access. Even if a user has the special knowledge, various steps are required to execute remote access which is inconvenient Hereinafter, exemplary embodiments in accordance with the present disclosure will be explained in detail by reference to the accompanying drawings.

Figure 1:
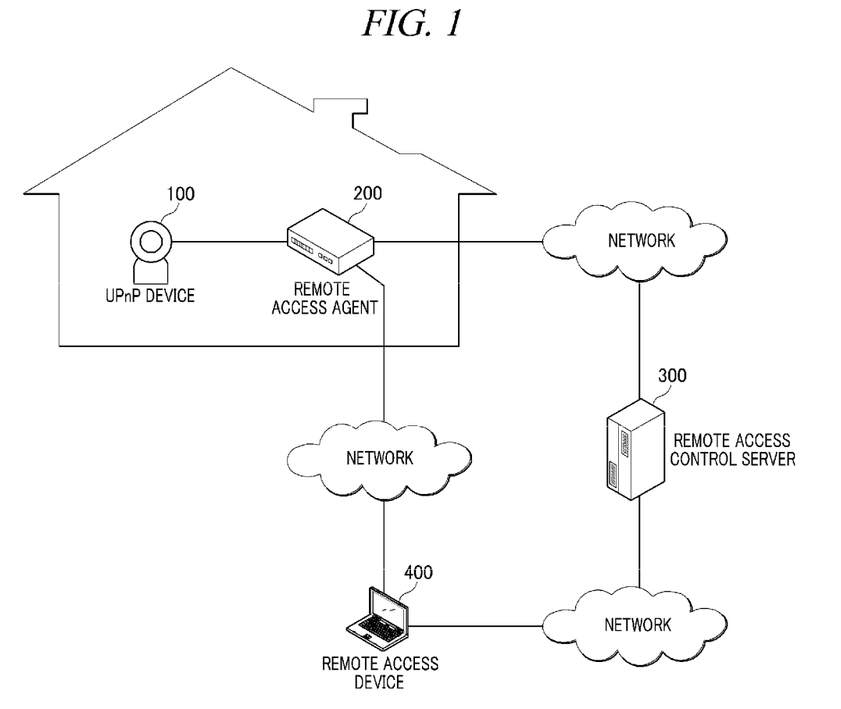
FIG. 1 is a view showing configuration of a system for providing remote access to a terminal within a home network according to an exemplary embodiment.

FIG. 1 is a view showing configuration of a system for providing remote access to a device within a home network according to an exemplary embodiment.

In a system for providing remote access to a device within a home network, a device targeted for remote access includes a Universal Plug and Play (UPnP) device 100 located within a home network constructed in a private network environment configured by a remote access agent 200.

The UPnP device 100 is allocated with a private IP address from the remote access agent 200, and transmits a description document including access information of the UPnP device 100 to the remote access agent 200.

The remote access agent 200 transmits the description document including the access information received from the UPnP device 100, user identification information such as ID and passwords of a user of the home network, and home network access information such as an IP address of the remote access agent 200, to a remote access control server 300 through a network.

Since the IP address of the remote access agent 200 is a public IP address, a terminal such as an external server or a desktop may access the remote access agent 200 through the Internet network or the like by using the public IP address of the remote access agent 200.

The remote access control server 300 receives the home network access information from the remote access agent of at least one home network, and stores the received home network access information from the home networks.

The remote access control server 300 provides list information of remotely accessible UPnP devices within the home network to the remote access terminal 400 in response to a request from the remote access terminal 400.

The remote access control server 300 receives a request for access information of the UPnP device from the remote access terminal 400, requests setting up port forwarding for the UPnP device 100 to the remote access agent 200 of the home network, in which the UPnP device is located, and receives a response signal thereto.

The remote access control server 300 generates or corrects access information of the UPnP device 100 based on a port forwarding response signal received from the remote access agent 200, and transmits the generated or corrected access information of the UPnP device 100 to the remote access terminal 400.

The remote access terminal 400 remotely accesses the UPnP device 100 through the remote access agent 200 by using the access information of the UPnP device 100 received from the remote access control server 300. The remote access terminal 400 is a terminal located outside the home network and may include terminals capable of executing data communication such as a desktop, a laptop, a smart phone, and a Personal Digital Assistant (PDA).

According to an exemplary embodiment, in order to access the UPnP device 100, a user of the remote access terminal 400 does not need to request setting up port forwarding to a gateway connected to the UPnP device 100, i.e., the remote access agent 200. The user requests access information from the remote access control server 300 to receive access information reflecting the setup for port forwarding from the remote access control server 300 such that the user easily accesses the UPnP device 100.

Figure 2:
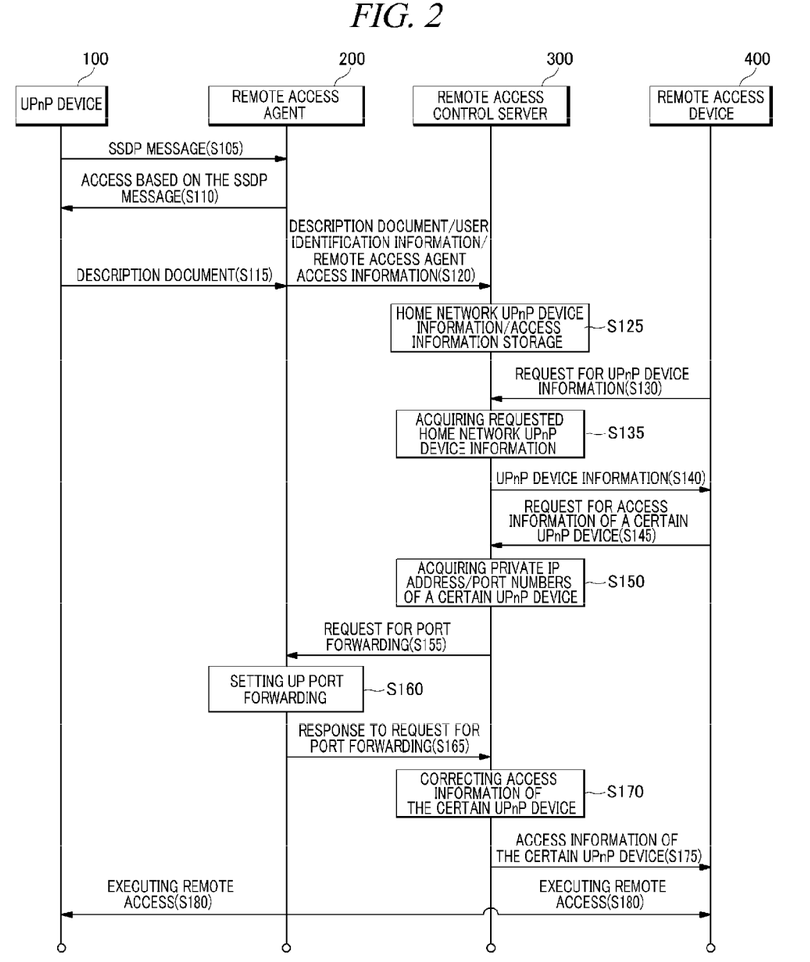
FIG. 2 is a signal flow chart showing flow of a method for providing remote access to a device within a home network according to an exemplary embodiment.

FIG. 2 is a signal flow chart showing flow of a method for providing remote access to a device within a home network according to an exemplary embodiment.

In operation S105, the UPnP device 100 transmits a Simple Service Discovery Protocol (SSDP) message to the remote access agent 200 within the home network.

As described, the UPnP device 100 transmits the SSDP message to the remote access agent 200 to inform the remote access agent 200 within the home network of the existence of the UPnP device 100. The SSDP message transmitted by the UPnP device 100 includes a LOCATION field including access information for a description XML document of the UPnP device 100, e.g., Uniform Resource Locator (URL) information.

In operation S110, the remote access agent 200 accesses the UPnP device 100 by using the access information for the description XML document of the UPnP device 100, which is included in the LOCATION field of the SSDP message received from the UPnP device 100.

That is, the remote access agent 200 requests access of the description XML document of the UPnP device 100 based on the SSDP message received in operation S105.

In operation S115, the remote access agent 200 receives the description XML document from the UPnP device 100.

In operation S120, the remote access agent 200 transmits the user identification information of the UPnP device 100 and the access information of the remote access agent 200 to the remote access control server 300, together with the access information of the UPnP device 100 included in the description XML document received from the UPnP device 100 in operation S115, e.g., the presentation URL information including the private IP address and the port numbers of the UPnP device 100.

The access information of the remote access agent 200 may include the IP address of the remote access agent 200.

The remote access agent 200 may obtain presentation URL information of at least one UPnP device within the home network including the remote access agent 200 and transmit the presentation URL information to the remote access control server 300.

The IP address of the remote access agent 200, i.e., the public IP address, may correspond to dynamic IP allocated by Dynamic Host Configuration Protocol (DHCP). The private IP address and the port numbers of the UPnP device 100 included in the presentation URL access information of the UPnP device 100 may vary. Accordingly, operation S105 to operation S120 may be cyclically carried out.

Accordingly, the remote access agent 200 may transmit the presentation URL information of the UPnP device 100, the user identification information, and the access information of the remote access agent 200 that are cyclically renewed, to the remote access control server 300.

In operation S125, the remote access control server 300 stores the access information of the UPnP device of the home network that includes the remote access agent 200, the user identification information of the UPnP device 100, and the access information of the remote access agent 200. The access information of the UPnP device, the user identification information, and the access information of the remote access agent 200 are stored in association with each other in the remote access control server 300. Accordingly, the remote access control server 300 may store the presentation URL information including the access information of the UPnP device 100.

The remote access control server 300 may separately manage and store list information of at least one UPnP device included in the home network that includes the remote access agent 200.

In operation S130, the remote access terminal 400 requests list information of UPnP devices included in the home network that includes the remote access agent 200 from the remote access control server 300.

The remote access terminal 400 may access the remote access control server 300 by using a web browser, and transmits user identification information to the remote access control server 300, such that the remote access terminal 400 may request list information of UPnP devices within the home network matching the user identification information.

In operation S135, in response to the request for list information of UPnP devices received in operation S130, the remote access control server 300 searches and acquires list information of UPnP devices within the home network matching the requested user identification information among list information of the UPnP devices stored in advance according to their home networks.

In operation S140, the remote access control server 300 transmits the UPnP device list information acquired in operation S135 to the remote access terminal 400.

In operation S145, the remote access terminal 400 selects a certain UPnP device, i.e., the UPnP device 100, from the UPnP device list information received in operation S140, and requests the remote access control server 300 to provide access information of the selected UPnP device 100.

In operation S150, the remote access control server 300 acquires information about the private IP address and the port numbers of the UPnP device 100 by using the presentation URL information of the UPnP device stored in operation S125, in response to the request for providing access information received in operation S145.

In operation S155, the remote access control server 300 transmits a message to request setting up port forwarding for the private IP address and the port numbers of the UPnP device 100, which have been acquired in operation S150, to the remote access agent 200.

In operation S160, the remote access agent 200 determines whether a port forwarding value for the private IP address included in the request message, i.e., the UPnP device 100, exists, in response to the request message received in operation S155.

If a preset port forwarding value for the UPnP device 100 exists, the remote access agent 200 acquires information about the set external port numbers for port forwarding.

If no preset port forwarding value for the UPnP device 100 exists, the remote access agent 200 sets port forwarding corresponding to the private IP address and the port numbers of the UPnP device 100, and acquires information about the set external port numbers.

In operation S165, the remote access agent 200 transmits a port forwarding setting up response signal including the external port number information acquired in operation S160 to the remote access control server 300.

In operation S170, the remote access control server 300 corrects the access information of the UPnP device 100 to reflect the external port number information included in the port forwarding setting up response signal received in operation S165, and the public IP address of the remote access agent 200 on the access information of the UPnP device 100, e.g., the presentation URL information of the UPnP device 100.

In operation S175, the remote access control server 300 transmits the access information of the UPnP device 100 that has been corrected in operation S170, to the remote access terminal 400.

In operation S180, the remote access terminal 400 executes remote access to the UPnP device 100 through the remote access agent 200 by using the access information of the UPnP device 100 that has been received in operation S175.

Figure 3:
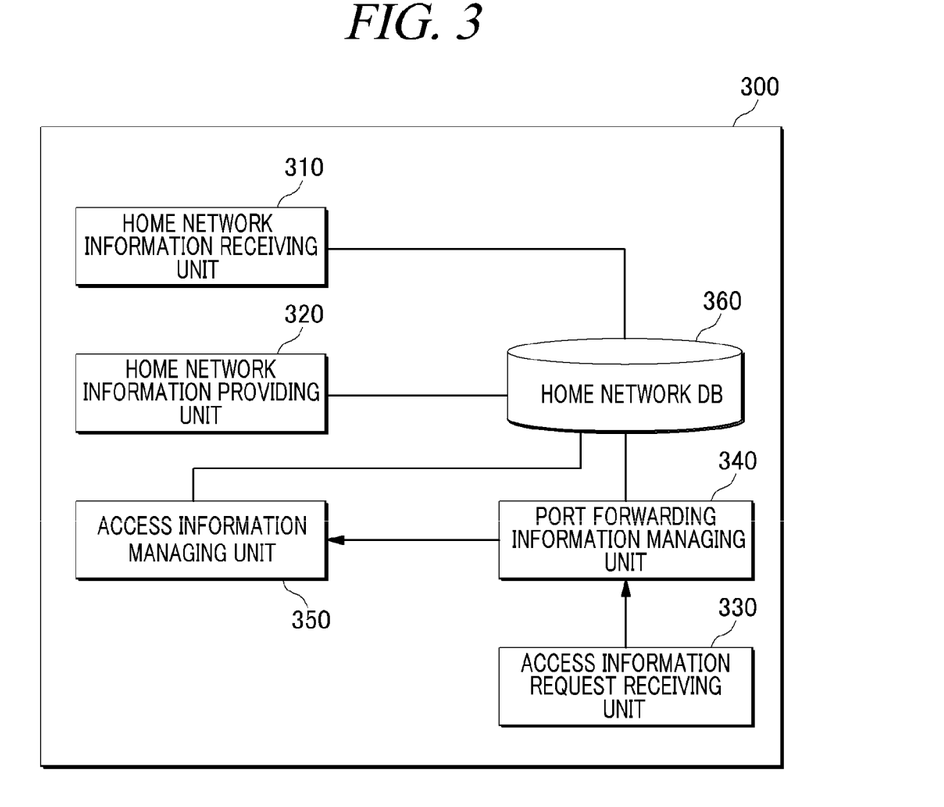
FIG. 3 is a view showing a configuration of a remote access control server of a system for providing remote access to a device within a home network according to an exemplary embodiment.

FIG. 3 is a view showing configuration of a system for providing remote access to a device within a home network according to an exemplary embodiment.

The remote access control server 300 includes a home network information receiving unit 310, a home network information providing unit 320, an access information request receiving unit 330, a port forwarding information managing unit 340, an access information managing unit 350, and a home network database (DB) 360.

The home network information receiving unit 310 receives, from the remote access agent (not illustrated) of the home network, the presentation URL information including the private IP address and the port numbers of the UPnP device included in the home network, the user identification information of the UPnP device, and the access information of the remote access agent.

Based on the received information, the home network information receiving unit 310 stores home network information including the list information of the UPnP devices by home networks, the access information of the UPnP device, the user identification information, and the access information of the remote access agent in the home network DB 360.

In response to a request for providing information of at least one UPnP device within the home network received from the remote access terminal (not illustrated) located outside the home network, the home network information providing unit 320 searches information of the UPnP device included in the home network requested by the remote access terminal from the home network DB 360 and transmits the information to the remote access terminal.

A signal for requesting information for the UPnP device, which is transmitted from the remote access terminal, may include the user identification information of the remote access terminal. The home network information providing unit 320 may search for a home network that matches the user identification information of the remote access terminal, and acquire UPnP device information matching the searched home network. The acquired UPnP device information of at least one UPnP device is transmitted to the remote access terminal.

Accordingly, the home network information receiving unit 310 may match the information of the UPnP device within the home network with the preset user identification information of the remote access terminal to store the information in the home network database 360.

The access information request receiving unit 330 receives a request for access information for remote access to a certain UPnP device included in the information of the UPnP device within the home network provided by the home network information providing unit 320, from the remote access terminal.

The port forwarding information managing unit 340 acquires access information including the presentation URL information of the UPnP device, for which access information has been requested by the access information request receiving unit 330, from the home network database 360, and acquires information about the private IP address and the port numbers of the UPnP device by using the presentation URL information included in the acquired access information.

The port forwarding information managing unit 340 transmits a message for requesting setting up port forwarding, including the acquired private IP address and port numbers of the UPnP device, to the remote access agent (not illustrated).

In response to the port forwarding setting up request message, the remote access agent sets up port forwarding for the UPnP device by using the private IP address and the port numbers of the UPnP device included in the received port forwarding setting up request message, and transmits the set external port number information to the access information managing unit 350.

The port forwarding information managing unit 350 transmits the external port number information received from the remote access agent to the access information managing unit 350.

The access information managing unit 350 corrects the presentation URL information of the UPnP device by using the information about the external port numbers set by the remote access agent for the UPnP device received from the port forwarding information managing unit, i.e., the UPnP device, for which access information has been requested from the remote access terminal, and the public IP address of the remote access agent.

That is, the access information managing unit 350 corrects the presentation URL information to include the external port numbers set for the UPnP device and the public IP address of the remote access agent in the presentation URL information of the UPnP device, for which access information has been requested, such that the remote access terminal can remotely access the UPnP device by using the corrected presentation URL information.

The access information managing unit 350 transmits the corrected presentation URL address to the remote access terminal, for which access information has been requested.

Accordingly, a user of the remote access terminal does not need to request setting up port forwarding to the remote access agent of the home network, which the user desires to access, and does not need to set the IP address of the remote access agent and the port numbers of the UPnP device. The user merely requests access information to the remote access control server 300 to execute setting up port forwarding, and receiving and setting up access information, so that the user can more easily execute remote access to the UPnP device within the home network.

The exemplary embodiments of the present disclosure can be embodied in a storage medium including instruction codes executable by a computer such as a program module executed by the computer. Besides, the data structure in accordance with the exemplary embodiments of the present disclosure can be stored in the storage medium executable by the computer. A computer readable medium can be any usable medium which can be accessed by the computer and includes all volatile/non-volatile and removable/non-removable media. Further, the computer readable medium may include all computer storage and communication media. The computer storage medium includes all volatile/non-volatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes a certain information transmission medium.

In accordance with exemplary embodiments of the present disclosure, the remote access terminal merely requests access information of the remote access targeted terminal such as an UPnP device to the remote access control server, such that the remote access terminal receives the access information of the remote access targeted terminal such as the presentation URL information including the information, in which port forwarding for the remote access targeted terminal is set up, and the access information, such as the public IP address, of the remote access agent as a gateway. Accordingly, the remote access terminal can more easily execute remote access to the terminal within the home network.

The above description of the present disclosure is provided for the purpose of illustration, and it would be understood by those skilled in the art that various changes and modifications may be made without changing technical conception and essential features of the present disclosure. Thus, it is clear that the above-described exemplary embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the exemplary embodiments. It shall be understood that all modifications and embodiments conceived from the meaning and scope of the claims and their equivalents are included in the scope of the present disclosure.

What is claimed is:

1. A method for allowing a remote access device to access a remote access target device within a home network through a remote access control server outside the home network, the method, performed by the remote access control server, comprising:

receiving, from a remote access agent of the home network, access information of the remote access target device within the home network and access information of the remote access agent;

receiving a request for the access information of the remote access target device from the remote access device;

in response to the received request for access information, requesting the remote access agent to set up port forwarding of a port of the remote access target device for which the access information is requested based on the access information of the remote access target device and the access information of the remote access agent, the port forwarding being set up in response to the request from the remote access control server;

receiving an answer to the request for setting up of port forwarding from the remote access agent including information on the port that was set up, and updating the access information of the remote access target device with the information on the port that was set up, based on the received answer; and sending the updated access information to the remote access device, wherein the updated access information allows the remote access device to access the remote access target device from outside the home network, and wherein updating the access information of the remote access target device comprises:

acquiring information on an external port number of the remote access target device from the answer to the request of the port forwarding, the external port number being allocated to the remote access target device by the port forwarding; and updating presentation Uniform Resource Locator (URL) information included in the access information of the remote access target device to include the public IP information of the remote access agent and the information on the external port number of the remote access target device into the presentation URL information.

2. The method of claim 1, wherein receiving the request comprises:

receiving, from the remote access device, a request for list information of devices included in the home network;

in response to the request for the list information, transmitting the list information of the devices included in the home network to the remote access device, the list information being compiled from access information of the remote access target device received from the remote access agent; and receiving a request for the access information of the remote access target device included in the list information of the devices, from the remote access device.

3. The method of claim 2, wherein transmitting the list information comprises:

acquiring user identification information of the remote access device from the request for the list information that has been received from the remote access device; and transmitting, to the remote access device, list information of at least one remote access target device within the home network corresponding to the user identification information.

4. The method of claim 1, wherein in requesting the port forwarding, the access information of the remote access target device includes information on a private Internet Protocol (IP) address and port number of the remote access target device, and the access information of the remote access agent includes a public IP address of the remote access agent.

5. A remote access control server for allowing a remote access device to access a remote access target device within a home network, the remote access control server being outside the home network and comprising:
- a home network information receiving unit configured to receive, from a remote access agent of the home network, access information of the remote access target device and access information of the remote access agent;
- a port forwarding information managing unit, in response to a request for the access information of the remote access target device received from the remote access device, configured to request the remote access agent to set up port forwarding of a port of the remote access target device for which the access information is requested based on the access information of the remote access agent and the access information of the remote access target device, the port forwarding being set up in response to the request from the remote access control server; and
- an access information managing unit configured to update the access information of the remote access target device with information on the port that was set up, based on an answer to the request for setting up of port forwarding received from the remote access agent that includes the information on the port that was set up, and transmit the updated access information to the remote access device,
- wherein the updated access information allows the remote access device to access the remote access target device from outside the home network, and
- wherein the access information managing unit updates the access information of the remote access target device by:
- acquiring information on an external port number of the remote access target device from the answer to the request of the port forwarding, the external port number being allocated to the remote access target device by the port forwarding; and
- updating presentation Uniform Resource Locator (URL) information included in the access information of the remote access target device to include the public IP information of the remote access agent and the information on the external port number of the remote access target device into the presentation URL information.

6. The remote access control server of claim 5, further comprising:
- a home network information providing unit configured to provide the remote access device with list information including information on at least one device included in the home network, the list information being generated based on the received access information of the remote access target device,
- wherein the request for the access information of the remote access target device is generated based on the list information provided to the remote access device.

7. The remote access control server of claim 6, wherein the home network information providing unit receives user identification information from the remote access device, and provides the remote access device with the list information on at least one remote access target device within the home network corresponding to the received user identification information.

8. The remote access control server of claim 5, wherein the access information on the remote access agent includes public Internet Protocol (IP) address information of the remote access agent, and
- wherein the port forwarding information managing unit requests port forwarding to the remote access agent corresponding to the public IP address.

9. The remote access control server of claim 5, wherein the access information of the remote access target device includes information on a private Internet Protocol (IP) address and port number of the remote access target device, and
- wherein the port forwarding information managing unit requests port forwarding to the remote access agent based on the information on the private IP address and the port number.

10. The remote access control server of claim 5, wherein the updated access information of the remote access target device includes presentation Uniform Resource Locator (URL) information including the information on the external port number of the remote access target device and the public IP address of the remote access agent.

11. A remote access control server coupled via an external network to a home network, the remote access control server comprising:
- a home network information receiving unit that receives, via the external network from a gateway of the home network, a private Internet Protocol (IP) address and port number for each of one or more remote access target devices which are coupled to the gateway via the home network, and a public IP address of the gateway;
- a port forwarding information managing unit that, in response to a request for access to a remote access target device received from the remote access device, requests the gateway to set up port forwarding of a port of the requested remote access target device based on the public IP address of the gateway and the private IP address and port number of the requested remote access target device, the port forwarding being set up in response to the request from the remote access control server; and
- an access information managing unit configured to update the port number of the requested remote access target device with information on the port that was set up, based on an answer to the request for setting up of port forwarding received from the gateway that includes the information on the port that was set up, and transmit the updated port number to the remote access device,
- wherein the updated port number allows the remote access device to directly access the requested remote access target device from outside the home network, and
- wherein the access information managing unit updates the port number of the requested remote access target device by:
- acquiring information on an external port number of the remote access target device from the answer to the request of the port forwarding, the external port number being allocated to the remote access target device by the port forwarding; and
- updating presentation Uniform Resource Locator (URL) information included in the access information of the remote access target device to include the public IP information of the remote access agent and the information on the external port number of the remote access target device into the presentation URL information.

12. A remote access control server coupled via an external network to a home network, the remote access control server comprising:
- a home network database that stores a private Internet Protocol (IP) address and port number of a remote access target device, and a public IP address of a corresponding remote access agent to which the remote access target device is coupled on a private home network;
- a controller which is configured to:
- receive, from a remote access device, a request for access to a remote access target device on the private home network,
- request the remote access agent that corresponds to the requested remote access target device to set up port forwarding of a port of the requested remote access target device based on the public IP address of the remote access agent and the private IP address and port number of the requested remote access target device, the port forwarding being set up in response to the request from the controller of the remote access control server,
- update the port number of the requested remote access target device with information on the port that was set up, based on the answer to the request for setting up of port forwarding that includes the information on the port that was set up, and
- transmit the updated port number to the remote access device for use in directly accessing the requested remote access target device from outside the private home network,
- wherein updating the port number of the requested remote access target device comprises:
- acquiring information on an external port number of the remote access target device from the answer to the request of the port forwarding, the external port number being allocated to the remote access target device by the port forwarding; and
- updating presentation Uniform Resource Locator (URL) information included in the access information of the remote access target device to include the public IP information of the remote access agent and the information on the external port number of the remote access target device into the presentation URL information.

13. The method of claim 1, wherein the presentation URL information comprises an IP address of the remote access target device and an IP address of the remote access agent.

14. The method of claim 1, wherein a user of the remote access device accesses the remote access target device from outside the home network without requesting the remote access agent that is connected to the remote access target device to set up port forwarding.

15. The method of claim 2, wherein the list information comprises information on the remote access target devices on the home network and information on the remote access agent.

16. The method of claim 2, further comprising transmitting, in response to the request for the access information, the access information of the remote access target device, the access information including port forwarding information for the remote access target device.

17. The method of claim 16, wherein the remote access device accesses the remote access target device from outside the home network using the port forwarding information for the remote access target device.

* * * * *